March 17, 1970     P. H. WIEDORN     3,500,935

TURBINE-POWERED HIGH-EXPANSION FOAM GENERATOR

Filed Aug. 31, 1967     2 Sheets-Sheet 1

United States Patent Office 3,500,935
Patented Mar. 17, 1970

3,500,935
TURBINE-POWERED HIGH-EXPANSION FOAM GENERATOR
Paul H. Wiedorn, Radnor Township, Delaware County, Pa., assignor to National Foam System, Inc., West Chester, Pa., a corporation of Delaware
Filed Aug. 31, 1967, Ser. No. 664,690
Int. Cl. A62c 35/00; F01d 5/00; F04d 29/02
U.S. Cl. 169—15                                     2 Claims

ABSTRACT OF THE DISCLOSURE

Such generators have fan driven by water turbine mounted within generator's tubular conduit. Water at pressures of 50 to 300 pounds per square inch is delivered to turbine intake which can be hose coupling on turbine located axially of conduit and pointing out from near intake end. Turbine discharge extends through proportioning mixer where foam concentrate is introduced, and then goes to spray arrangement for spraying the water mixed with concentrate toward foam-forming fabric net or generally frustoconical wire mesh assembly secured to outlet end of conduit. All turbine bearings, rotary and thrust, are Teflon which can isolate rotor and rotor shaft, both of which can be of copper based alloy, from turbine casing which can be aluminum. Thrust bearing having at least $\frac{1}{20}$ inch wide thrust edge face effectively minimizes turbine leakage around projecting rotor shaft. Other end of shaft can have bearing completely enclosed by turbine casing so that no external leakage is possible there, and this can be at inlet end of rotor.

---

The present invention relates to fire fighting units of the high expansion foam generator type, such as described in U.S. Patent 3,186,490, granted June 1, 1965, and U.S. patent application Ser. No. 457,076, filed May 19, 1965 but now abandoned. Such generators rapidly produce an air-water foam containing four hundred or more times as much air as water, and are accordingly very effective for extinguishing certain types of fires such as those in confined quarters. Because of the rapidity with which they produce foam they can also be used to form large bodies of foam to serve as barriers for unruly people. While the foam is not inherently dangerous to life or health and it is possible to breathe while totally immersed in such foam, visibility is sharply restricted when so immersed, leading to a feeling of discomfort that keeps people from trying to make their way through the foam.

The large production of foam requires a blower of substantial air moving ability, and a water-turbine makes a very desirable arrangement for operating such a blower inasmuch as sources of pressurized water are readily available and the water can thus be used both to provide the blowing action and the water content of the foam.

Among the objects of the present invention is the provision of novel water-turbine high-expansion foam generator features that enable particularly desirable operation.

Figure 1:
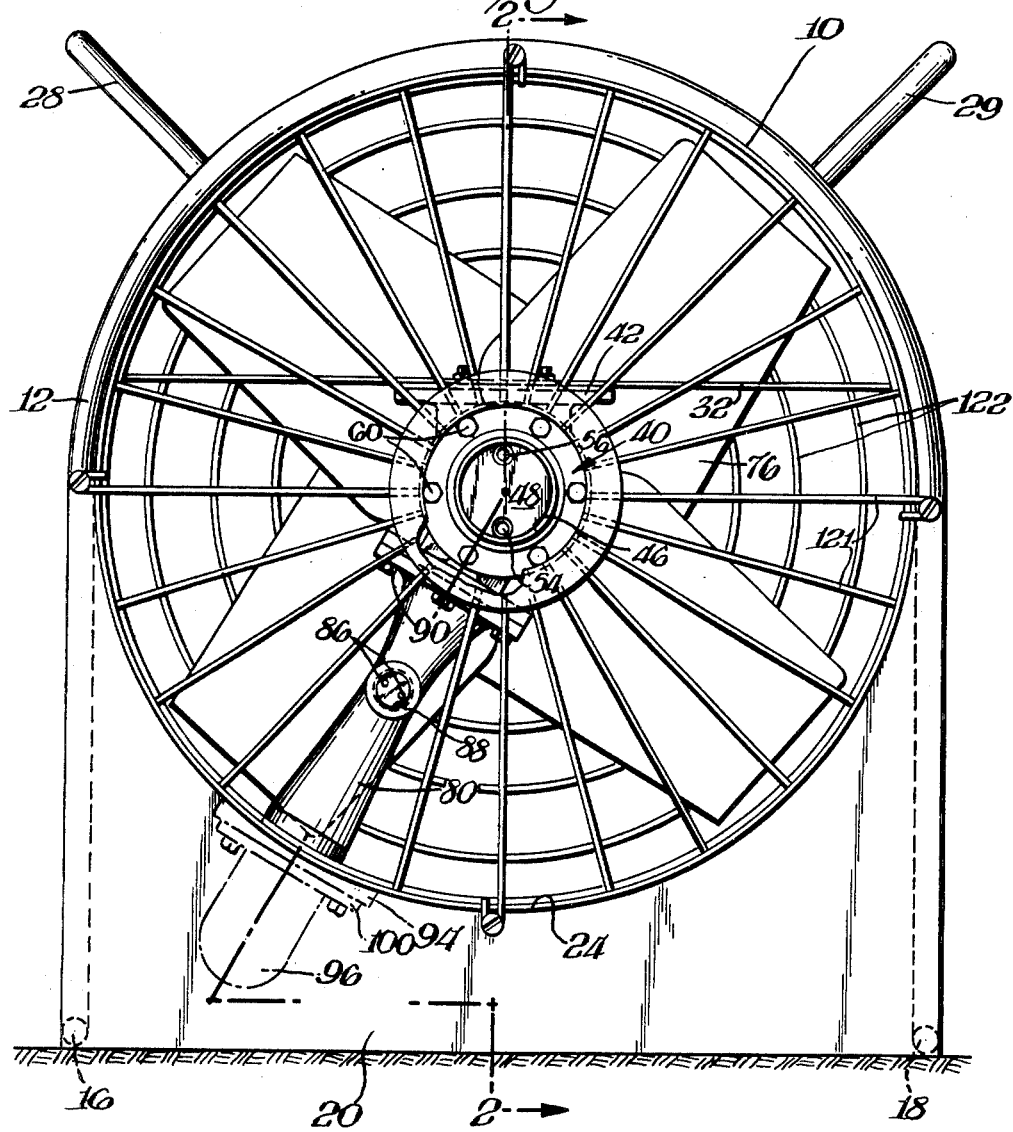
Figure 2:
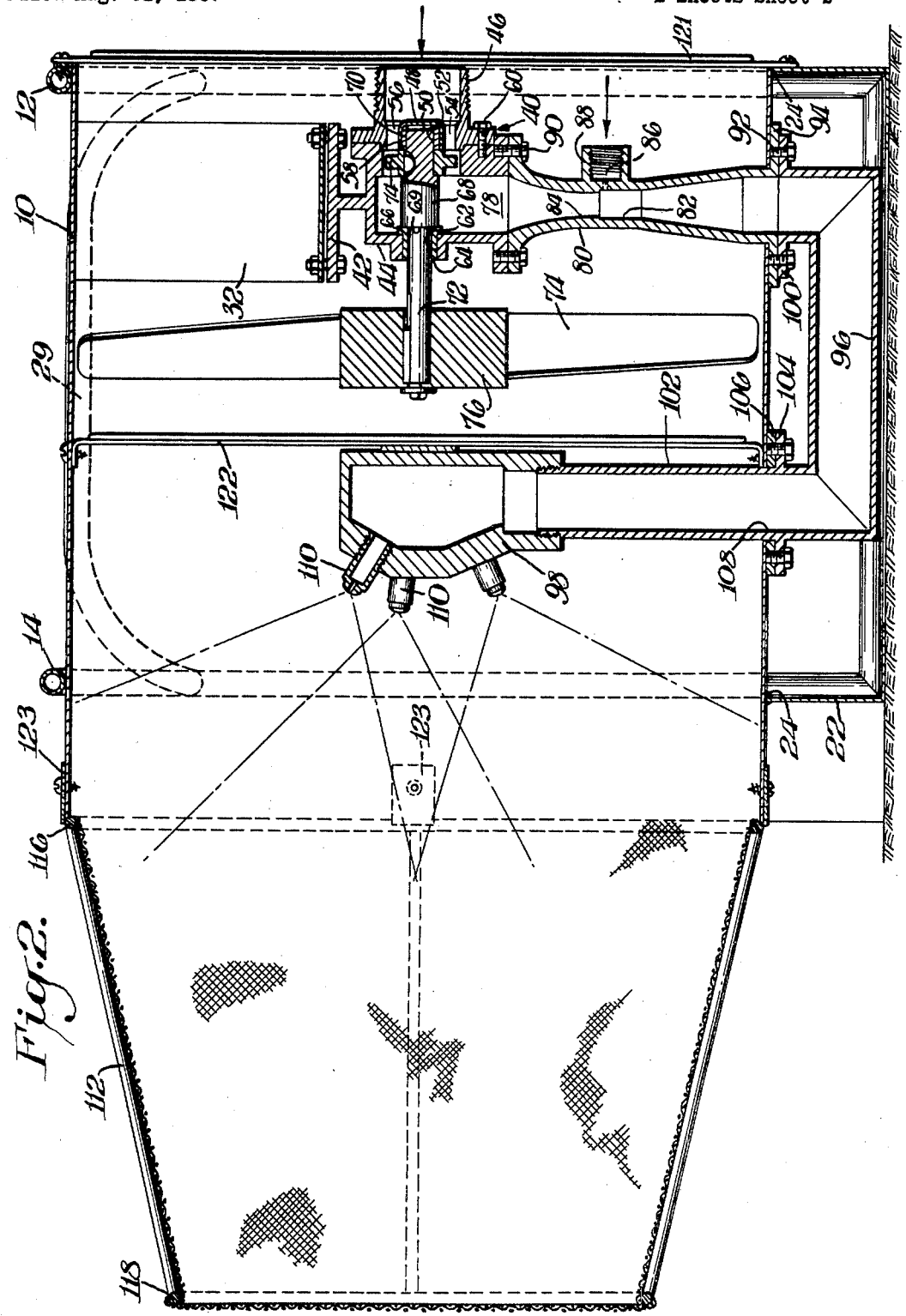

The foregoing as well as additional objects of the present invention will be more readily understood from the following description of several of its exemplifications, reference being made to the accompanying drawings wherein:

FIG. 1 is an elevational view of a generator pursuant to the present invention, looking at its intake opening; and FIG. 2 is a sectional view of the generator of FIG. 1 taken generally along the line 2—2.

According to the present invention a high expansion foam generator with a water-turbine operated air blower has all the turbine bearings made of Teflon. The turbine housing which is readily made of aluminum as by casting can then be used with a rotor and a rotor shaft made of stronger materials such as copper base alloys that are isolated from the housing by the bearings to thus reduce corrosion problems.

The turbine of the present invention has its intake in the form of a hose coupling so that it can be directly connected to a fire hose or the like. The coupling can project from the turbine axially of and within the generator conduit so as to be easily available and be free of bends. The discharge of the turbine leads through a proportioning mixer which sucks in foam concentrate in the proportion suitable for producing the high expansion foam. The discharged water containing the foam concentrate is led to a spray head through which it is sprayed into the relatively coarse mesh net placed in the path of the air blower as shown in the above patent application. This arrangement makes most effective use of the water pressure initially available, by causing it to operate the blower to give maximum air flow while still leaving the small amount of pressure in the water discharging from the turbine to enable that discharge to operate a proportioning mixer and then spray itself into the foam-forming net. A greater foam-producing capacity is thus available from the same sized equipment supplied with the same stream of water, as compared with having the concentrate mixed with the water before the water operates the turbine.

Turning now to the drawings, the figures show a construction in which a turbine conduit 10 is held by a framework in a manner similar to that described in Ser. No. 457,076. The framework consists primarily of two metal pipes 12, 14 each bent into the shape of an inverted U, with the lower ends of each connected to the other as by additional lengths of pipe 16, 18 welded between them. Metal sheets 20, 22 are welded to the respective pipes 12, 14, and have a semicircular cutout 24 at their edge so as to receive the lower portion of conduit 10. All portions of the foregoing construction can be welded or brazed together and to the conduit to provide a rugged construction. For convenience in carrying, the generator is provided with handles 28, 29 that can be welded between the respective pipes 12, 14.

Within the conduit 10 and adjacent its intake end there is positioned as by welding or brazing a hanger 32 to which is secured water turbine 40. Hanger 32 is shown as the form of an inverted T that provides three locations, at the ends of the stem and arms, by which it can be securely engaged to the conduit. The water turbine has a supporting plate 42 held as by bolts to the hanger, and a body 44 which is integrally formed with the supporting plate as by casting them in one piece from aluminum. The term aluminum as used herein refers to pure aluminum or alloys containing at least 90% aluminum. A desirable aluminum alloy for the turbine body 44 is type 356T6, although others can also be used.

At its inlet end the turbine body 44 carries a hose coupling 46 which can also be made of the same alloy used to make the body. In the illustrated embodiment the coupling includes an internal partition 48 that contains a socket 50 in which is pressed a rotor bearing 52, and two diametrically opposed injector jet passageways 54, 56. Bearing 52 is of the sleeve-type, made of Teflon, and includes a radially projecting shoulder 58 that provides a larger thrust surface so that it acts as both a rotary and a thrust bearing for a rotor and rotor shaft.

The coupling 46 is removably secured to the body 44 in accurately aligned position as by bolts 60, so that the turbine is conveniently assembled and opened for inspection and maintenance. The body 44 has a passageway 62 aligned with socket 50 and also fitted with a pressed-in Teflon bearing 64 that has a thrust shoulder 66. Rotor shaft 68 has turned-down ends 70, 72 that are rotatably received in the respective bearings. Shaft end 70 also carries the vaned rotor 74 which can be shrunk on and keyed in place as indicated. The vanes of the rotor are located in the path of the jets from passageways 54, 56.

Rotor shaft end 72 carries the fan which may as shown have a hub 74 securely mounted on the shaft as by keying and set screws or thermal shrinking. Both the rotor shaft 68 and the rotor can be made of red brass or phosphor bronze or other copper based alloys that are resistant to corrosion. While cupreous metals are known to increase the corrosion of any aluminum that they contact, in the construction of the present invention the cupreous shaft and rotor do not contact the aluminum rotor housing, and there is no significant corrosion problem.

Rotor body 44 has a water discharge opening 78 adjacent its lowest portion, and this opening leads to a proportioning mixer 80 of the jet of venturi type which can also be cast from aluminum. Mixer throat 82 and neck 84 can be machined to exact size, a pair of spaced jet passageways 86 being drilled through the side wall of the venturi and opening into a connector 88 to which the form concentrate is supplied. A check valve can be inserted in this connector if desired.

Proportioning mixer 80 is illustrated as secured to turbine body 44 by bolts 90, and projects out through an opening 92 in the wall of conduit 10. An outer connection flange 94 on the mixer can be made larger than the opening 92 so that the mixer can be inserted from the outside through the opening and fastened to the turbine body with flange 94 resting against the outside surface of the conduit 10.

A J-shaped connector 96 extends from the discharge end of the mixer to a spray manifold 98 which is located within the conduit and directly downstream of the turbine. Connector 96 has its short arm provided with a mounting flange 100 by which it can be bolted to the flange 94 of the mixer. From here the connector extends outside of the conduit 10 to its long arm 102 which projects through the wall of conduit 10, to the spray manifold. Where the long arm 102 approaches the wall of conduit 10 it carries a welded or brazed-on mounting flange 104 by which it is secured to a mating flange 106 welded or brazed around another opening 108 in the conduit wall.

As is shown in FIG. 1 connector 96 is so oriented that its projection from the conduit 10 is spaced from the very bottom as well as from the extreme side of the conduit, so that it does not require much of an increase in height or width of the generator. Thus a generator having a conduit 18 inches in diameter can be made with an overall height of no more than 22 inches and an overall width of less than 20 inches.

Spray manifold 98 has a plurality of spray nozzles 110, five for example, directed downstream of the air flow as well as outwardly so as to spray the foaming liquid generally towards the edge of the conduit wall at its discharge end. Secured to this edge can be either a fabric net bag as described in application Ser. No. 457,076, or a frustoconical metal mesh assembly 112. This assembly 112 is preferably of stainless steel wire mesh with square mesh eight mesh to the inch in each direction. A convenient size for the mesh wire is about 0.07 inch in diameter, or from 0.05 to 0.1 inch, and the mesh is held in place as by silver soldering to a framework made up of a large ring 116 that fits around the conduit 10, a smaller ring 118, and a set of spacing rods 120 connecting the rings and welded to each of them. A taper of about 14° as illustrated (or 28° as measured at the apex of the cone) makes a very suitable arrangement for the mesh assembly although this taper can vary from about 20 to 35° as measured at the apex of the cone. The frustum of the mesh assembly is the diameter of ring 118 and can have a width about 60 to 75% of the base of the assembly (at ring 116). Where the conduit is 18 inches in diameter the frustum width is preferably 12 inches.

Where the conduits are larger, as for example 48 inches in diameter, the frustum of the cone can advantageously be fitted with a wire mesh in the form of an inverted short cone instead of a planar mesh as in FIG. 2. Such a short cone can have an apex angle of between 90 and 135°, preferably 120°, and can be made of wire mesh cut to shape and welded or soldered together without radial supports. It is also helpful to slightly curve supports 112 for the sides of the frustoconical mesh so that they taper toward each other more rapidly than the uncurved supports illustrated.

For ease in attaching to the wall of the conduit, the mesh assembly can have its ring 116 provided with a set of welded-on tabs 122 that can have bolt-receiving holes or slots for bolting to the conduit wall.

With either the net fabric bag or the wire screen assembly an 18 inch diameter generator pursuant to the present invention will generate more than 2300 cubic feet of foam per minute when supplied with water at a pressure of 200 pounds per square inch. Pressures of 50 to 300 pounds per square inch can be used effectively, however.

As in Patent 3,186,490, the generator can be used with a flexible outlet tube, of nylon cloth for example, to help conduct the foam to the site of the fire. The tube can be 60 to 90% wider than the conduit, with one end of the tube having a series of tucks to bring it down to a width that makes a relatively close fit over the conduit. Loops sewn in at the tucked end can receive a cord or belt by which the tube can be releasably secured to the conduit.

The generator can also be equipped with grill-type guards 121, 122 as in application Ser. No. 457,076, to prevent any inadvertent insertion of a hand in the fan blades during operation.

The thrust shoulder 66 of bearing 64, if made to have a thrust edge face at least about $\frac{1}{20}$ inch wide in good wiping contact with the mating shoulder 69 formed at the turned-down portion of rotor 68, will substantially eliminate leakage of water through the bearing and around the projecting rotor shaft. It will be noted that this bearing opens into the low pressure side of the turbine rotor, thus further reducing the tendency to external leakage. The thrust shoulder 66 is also a flange that overlaps the joint between bearing 64 and the aperture in the housing wall in which the bearing is fitted, thus reducing the tendency to leak in that joint.

Bearing 52 is internally located so that it does not project through the wall of the turbine casing and accordingly cannot leak to the exterior.

Because the axial thrust against the rotor by the incoming water is greater than the axial reaction of the fan, the operation of the turbine causes rotor shoulder 69 to be forcefully pressed against thrust bearing 66, and it is this action together with the adequate thrust edge face dimension that so effectively controls leakage.

It is peferred to give the Teflon bearings a final machining after they are pressed into place inasmuch as the pressing action generally causes the bearing to distort a little.

While water pressures of up to 300 pounds per square inch can be used in the illustrated turbine, at pressures higher than 200 pounds per square inch it is better to have the turbine inlet made somewhat stronger than indicated above.

Obviously many modifications and variations of the present invention are possible in the light of the above teachings. It is, therefore, to be understood that within the scope of the appended claims the invention may be practiced otherwise than as specifically described.

What is claimed:

1. A high expansion foam generator having a tubular conduit, a blower connected to blow air through the conduit, a water turbine connected to operate the blower from a moving stream of water, the turbine having intake and discharge openings for the stream of water, the discharge opening being connected through a venturi proportioning mixer to a spray head in the conduit, to suck a foam concentrate into the stream discharging from the turbine and spray the diluted concentrate in the path of the air blown by the blower.

2. A high expansion foam generator having a tubular conduit, a fan connected to blow air through the conduit, a water turbine centrally mounted within the conduit adjacent one of its ends and having a rotor that carries the fan blades, the turbine having intake and discharge openings for the stream of water, the discharge opening being connected through a venturi proportioning mixer to a spray head in the conduit to suck a foam concentrate into the stream discharging from the turbine and spray the diluted concentrate in the path of the air blown by the fan, the intake opening of the turbine being in the form of a hose coupling extending axially from the turbine and within the conduit.

References Cited

UNITED STATES PATENTS

| 2,256,479 | 9/1941 | Holzwarth. | |
| 3,139,832 | 7/1964 | Saunders | 103—114 X |
| 3,393,745 | 7/1968 | Durstewitz | 169—15 |

FOREIGN PATENTS

| 176,118 | 9/1953 | Austria. |
| 500,425 | 12/1919 | France. |
| 1,120,324 | 7/1968 | Great Britain. |

M. HENSON WOOD, JR., Primary Examiner

M. Y. MAR, Assistant Examiner

U.S. Cl. X.R.

103—114; 230—116; 253—77